(12) United States Patent
Revels

(10) Patent No.: US 9,367,632 B2
(45) Date of Patent: Jun. 14, 2016

(54) ACCESSION OF POSITION-RELATED DATA

(76) Inventor: William T J Revels, Killinchy (GB)

(\*) Notice: Subject to any disclaimer, the term of this patent is extended or adjusted under 35 U.S.C. 154(b) by 1770 days.

(21) Appl. No.: 12/522,303

(22) PCT Filed: Oct. 29, 2007

(86) PCT No.: PCT/GB2007/004121
§ 371 (c)(1),
(2), (4) Date: Jul. 7, 2009

(87) PCT Pub. No.: WO2008/084180
PCT Pub. Date: Jul. 17, 2008

(65) Prior Publication Data
US 2010/0173681 A1    Jul. 8, 2010

(30) Foreign Application Priority Data
Jan. 11, 2007    (GB) .................................. 0700539.0

(51) Int. Cl.
| H04W 24/00 | (2009.01) |
| G06F 17/30 | (2006.01) |
| H04W 4/02 | (2009.01) |
| H04W 4/20 | (2009.01) |
| H04L 29/08 | (2006.01) |

(52) U.S. Cl.
CPC ............ *G06F 17/3087* (2013.01); *H04L 67/18* (2013.01); *H04W 4/02* (2013.01); *H04W 4/20* (2013.01)

(58) Field of Classification Search
CPC ..... G06F 17/3087; H04L 67/18; H04W 4/02; H04W 4/20
USPC .......... 455/404.2, 414.1, 414.4, 456.1, 456.2, 455/457
See application file for complete search history.

(56) References Cited

U.S. PATENT DOCUMENTS

| 6,741,853 | B1 | 5/2004 | Jiang et al. | |
| 7,277,718 | B2* | 10/2007 | Wong | ............................. 455/466 |
| 2004/0167706 | A1* | 8/2004 | Becker | ......................... 701/206 |
| 2004/0203854 | A1* | 10/2004 | Nowak | ....................... 455/456.1 |
| 2006/0030337 | A1 | 2/2006 | Nowak | |
| 2007/0176796 | A1* | 8/2007 | Bliss et al. | ............... 340/995.14 |
| 2008/0147319 | A1* | 6/2008 | Cubillo | ......................... 701/211 |

FOREIGN PATENT DOCUMENTS

| WO | 99/45732 | 9/1999 |
| WO | 99/46947 | 9/1999 |
| WO | 03/107708 A1 | 12/2003 |

OTHER PUBLICATIONS

International Search Report for PCT/GB2007/004121, mailed Feb. 20, 2008.
UK Search Report dated Oct. 9, 2007 in Application No. GB0700539.0.
Office Action (3 pgs.) dated Aug. 9, 2012 issued in corresponding Chinese Application No. 200780049618.5 and translation.

\* cited by examiner

*Primary Examiner* — Kent Chang
*Assistant Examiner* — Nelson Rosario

(57) ABSTRACT

Requests (94) for location-dependant information, received from a mobile device (1) having a location-finding capability (10), are processed by middleware (4, 40) which identifies the handset type and generates instructions (93, 95) specific to the handset type to provide the data (94, 97) required to generate the required data (99) in a format compatible with the handset (1).

9 Claims, 4 Drawing Sheets

ACCESSION OF POSITION-RELATED DATA

This application is the U.S. national phase of International Application No. PCT/GB2007/004121 filed 29 Oct. 2007, which designated the U.S. and claims priority to Great Britain Application No. 0700539.0, filed 11 Jan. 2007, the entire contents of each of which are hereby incorporated by reference.

This invention relates to a method for providing data to) a user of a communications terminal.

BACKGROUND AND SUMMARY

There are currently a number of services available to provide information specific to a given location. Such systems require knowledge of the location about which information is required, and a database having location-related information. The location-related information may be directory information such as a list of services, or mapping or directional information.

The definition of the required location is relatively straightforward if the user knows where it is, and various services are available which allow a user to enter a map reference, postcode or the like and retrieve location related information. Such information may be stored locally to the user, for example on a CD-ROM, or it may be accessible using a communications system, for example the online mapping systems such as "Streetmap" and "Multimap". The latter are more readily updatable, but require a communications connection.

However, if the user is not aware of his location sufficiently accurately, or at all, it is first necessary to determine it. Several systems are available to provide such information by reference to beacons whose location is known. Modern cellular telephone base stations provide a convenient network of such beacons, but of more universal utility and greater accuracy are satellite-based navigation systems such as GPS (Global Positioning System) and the proposed Galileo system.

In-vehicle navigation systems are now available. These generally combine a GPS receiver with an on-board mapping database. Because the database is carried on board the vehicle, it is limited in capacity and has no dynamic characteristics, so that it cannot respond to changes in the infrastructure (either permanent, such as new roads, or temporary, such as traffic congestion), changes in availability of local services, or weather reports.

Systems also exist in which mobile devices determine their position using a satellite or beacon navigation system and report to a central database. The positions of the mobile devices can then be used to generate data, for example to track the movement of valuable cargoes and stolen vehicles, or to provide real time information on the whereabouts of public transport vehicles for the information of their operators and users. Such existing systems require the mobile device to report its location, in response to interrogation, at regular intervals, or some other prompt such as proximity to a beacon. The interface with the central database is a dedicated system, requiring the mobile device to be configured to generate data in a specific format to co-operate with the central database, and for the database to be able to identify the individual terminal making a request for data in order that it may return data to the correct terminal.

Mobile communications devices are becoming available having a number of additional features, for example position finding systems, "web"-browsers capable of accessing data networks such as the "Internet", and other facilities. The present invention is a web-based system designed to interact with devices having, among other features, such a browser as well as an integral position finding system.

In prior art systems the handset has to be configured with means to convert the position data into a standard format recognisable by the mapping application. This requires conversion to the required co-ordinate system (e.g., from a post code, or from a Cartesian grid system, to spherical co-ordinates—longitude and latitude), and also giving the position data in the numerical form required by the online application (e.g. degrees, to three decimal places). This is inconvenient, as it requires a software download, and also requires that the data can in fact be accurately converted to the required precision. This is particularly problematical if the location is determined by the handset to a much lower degree of precision than that required by the application. For example, location data for a beacon may be accurate to the nearest ten meters, or even less, but in a sparsely populated area the handset itself may be 10 km or more away from the beacon. If the application 5 is not capable of identifying whether the precision with which it requires data to be provided is actually appropriate, the data it may provide may be relevant to the location of the beacon rather than that of the handset.

The present invention overcomes this problem, and allows the use of industry-standard terminals, by providing an apparatus for processing requests for location-dependant information, comprising means for receiving a request for location-related data, means for interrogating the device to identify its capability to report a location, means for generating a request for a location report from the device in a form appropriate to the identified capability, means for receiving a location report generated by the device, means for processing the location report such that data related to the reported location can be selected, means for retrieving the selected location-related data, and means for transmitting the retrieved data to the device.

The network-based application, in interacting with the mobile device, identifies the device type and its capabilities, and uses that information to generate a request, in a format that the user device can use, for the information it needs in order to meet the user's request, in particular the location for which information is requested. By incorporating the processing in the network-based apparatus, the present invention allows location-based information to be accessed by a standard mobile device, without prior registration or configuration for the service, and allows frequent updating of the data that is available, including the provision of real-time information such as availability of services, transport timetables and disruption, etc. In a preferred arrangement, the apparatus also includes means for selecting location related data according to the type of data requested. The apparatus may also monitor the location data provided by the device over a period of time, and provide updated or modified location-based data according to changes in the location reported by the device.

In another aspect, the invention provides a method of processing requests for location-dependant information, comprising the steps of receiving a request for such information, interrogating the device from which the request is received to identify its capability to generate location reports, in response to the reported capability, requesting a location report from the device in a form appropriate to the reported capability, processing the location report such that data related to the reported location can be selected, retrieving the selected location-related data, and transmitting the retrieved location-related data to the device.

BRIEF DESCRIPTION OF THE DRAWINGS

An embodiment of the invention will now be described by way of example with reference to the Figures, in which.

DETAILED DESCRIPTION OF EXAMPLE EMBODIMENTS

Figure 1:
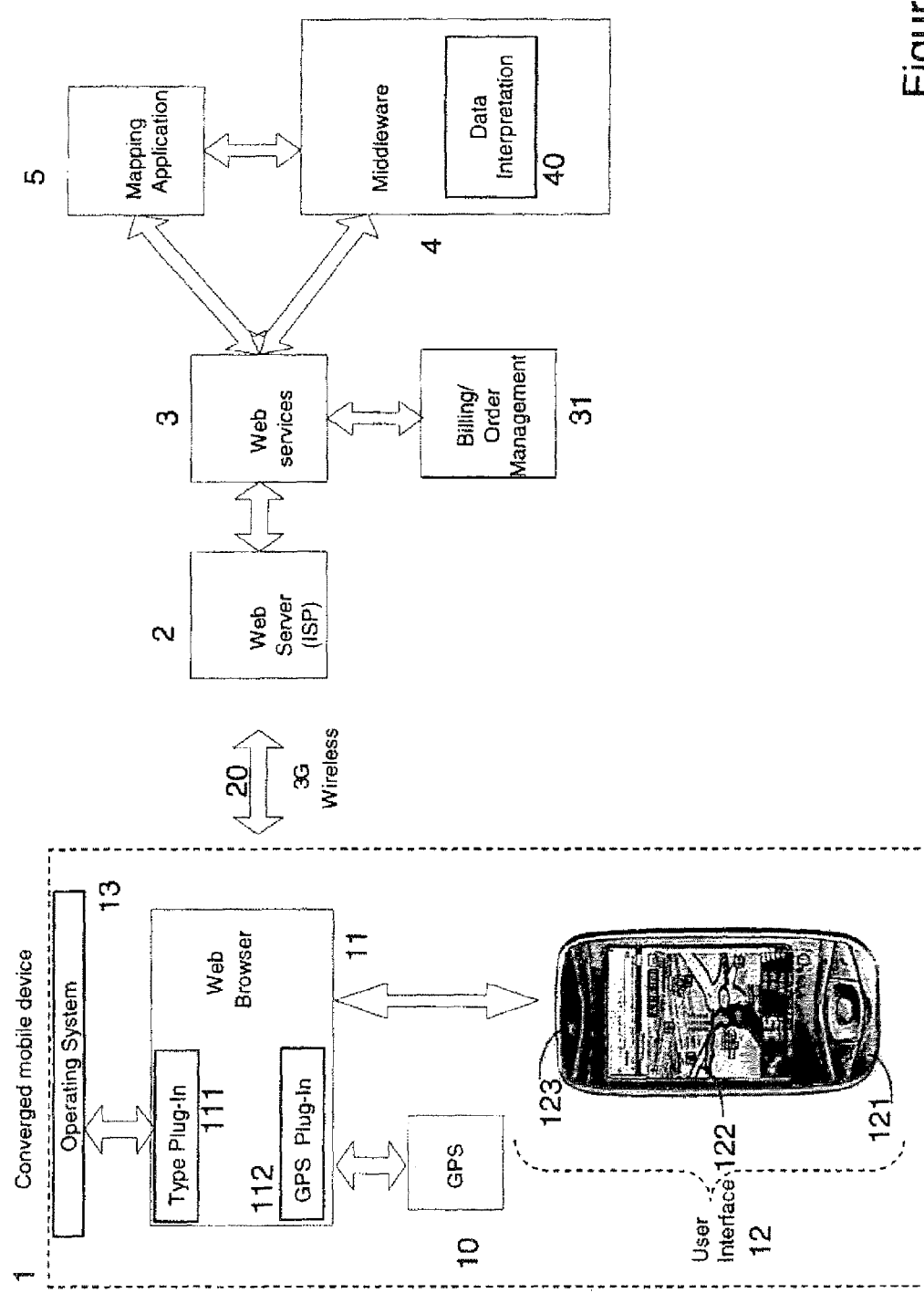
FIG. 1 is a schematic representation of the functional elements that co-operate to form the invention.
Figure 3:
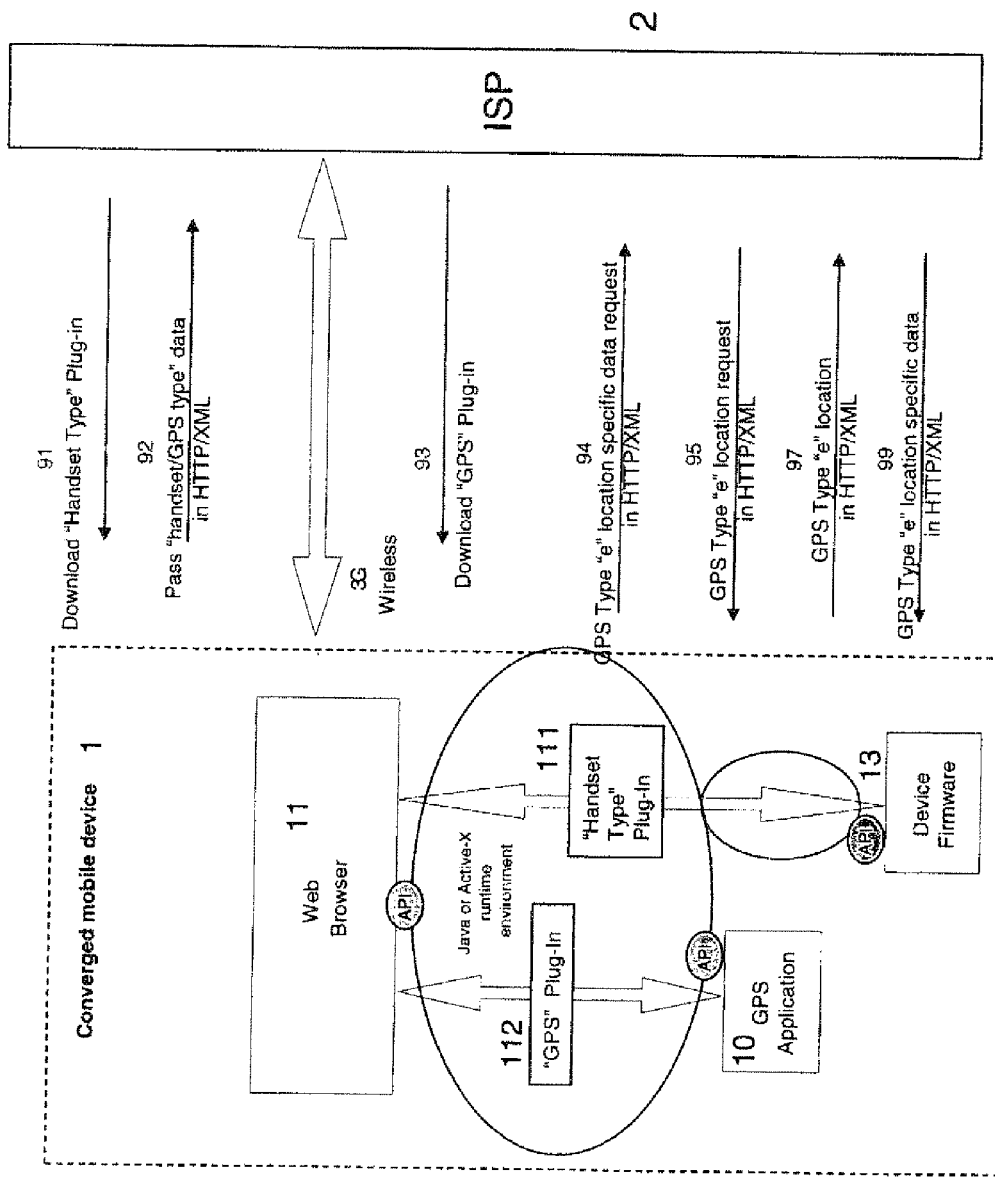
FIG. 3 is a schematic diagram showing the organisation and operation of the user device in more detail.

As shown in FIGS. 1 and 3, a user device 1 comprises a GPS receiver 10, a web browser 11 and a user interface 12, itself comprising an input device such as a keypad 121 and an output device such as a screen. 122 or earpiece 123. The input and outputs depicted in FIG. 1 are by way of example only: other interfaces are also possible, for example touch-sensitive screens, tactile outputs such as Braille, and voice activated inputs. The user device also includes elements of "firmware" 13—permanent data used to control the device and identify it when in communication with other devices and systems.

The various components of the user device are under the overall control of an operating system. The browser 11 is capable of accepting various "plug-in" software packages 111, 112 that can be downloaded to it over a communications interface 20, typically a wireless connection using a protocol such as GPRS or 3G.

The GPS receiver 10 monitors the location of the device using conventional satellite navigation processes: this may be a continuous process, or it may be performed only in response to commands from the user input 121 or from internal processes performed by the browser 11 or other elements of the device 1. Location systems other than satellite navigation may be used, such as systems based on terrestrial beacons.

The web browser 11, like the GPS receiver, is now a common feature in mobile devices. A web browser 11 provides access between a user device 1, by way of the communications link 20, and a web server 2 operated by, the user's internet service provider (ISP). In turn, the web server 2 provides access through an information network (typically the "Internet") to individual web services 3.

To access an individual service 3 the user instructs the browser 11 to access the required service, by using the keypad 121 (or other input device) to enter a command. The browser 11 uses the communications interface 20, to access the web server 2 to which the user subscribes, and provides the appropriate address data for the web server 3 to locate, and establish communication with, the required web service 3. The address data for the required web service 3 may have been previously programmed into the browser 11 using a "bookmark" for ready retrieval by the user, or it may have been found by initially contacting an online search service such as "Google", which returns the address data to the user in a form which allows the user to establish contact.

In the present invention, the web server 3 is used to request data relating to a specific location, typically the current location of the user. This is done by use of a mapping application 5, operating through middleware 4. The middleware 4 has a number of stored "plug-in" applications 111, 112, stored in a database 42, which can be downloaded to control the handset 1, and a data interpretation system 40 to process data received from the mapping application 5 and the handset 1 to generate the required data.

Figure 2:
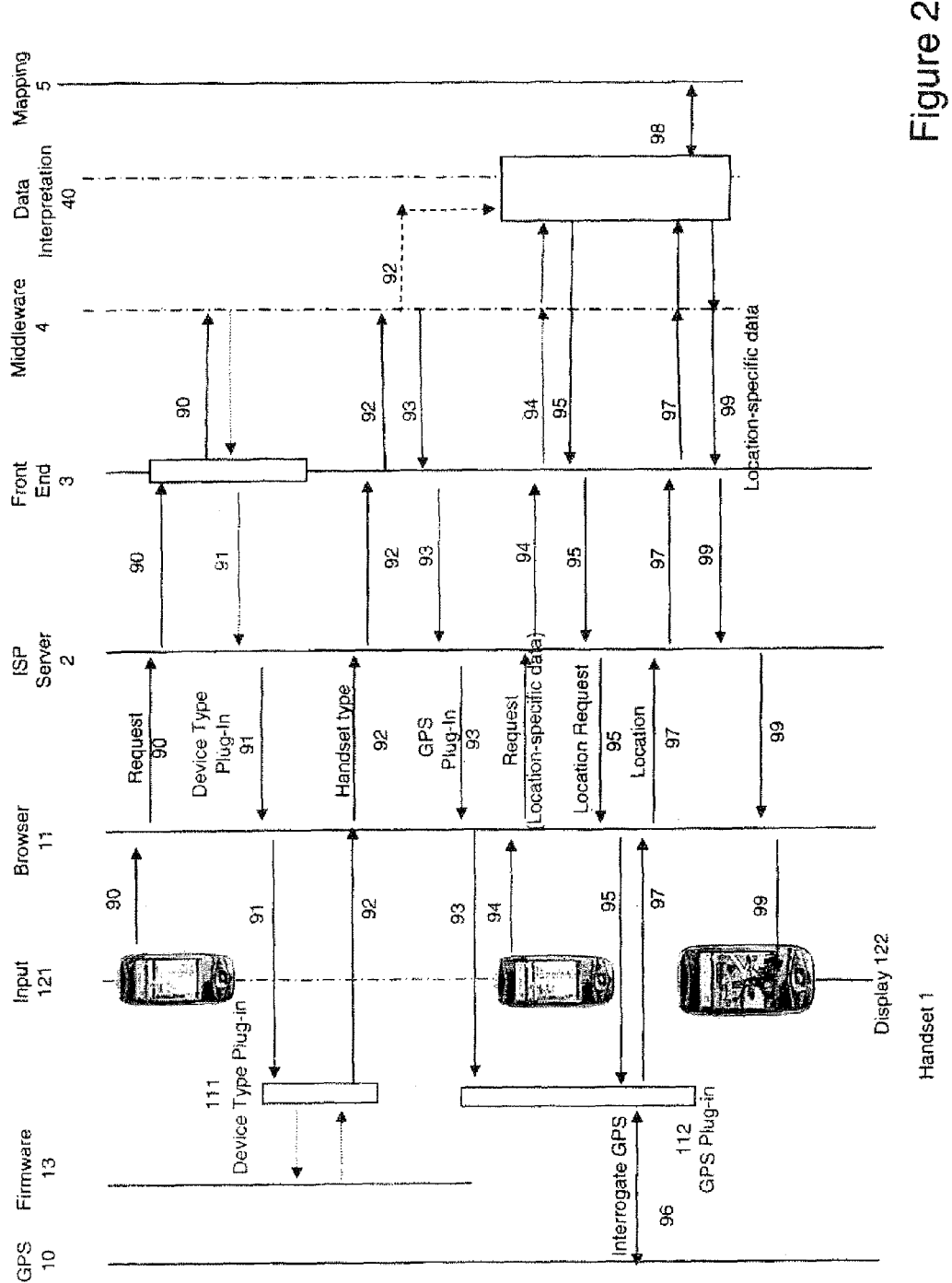
FIG. 2 is a flow diagram, showing the steps by which data is obtained from a database by the user device, according to its location.
Figure 4:
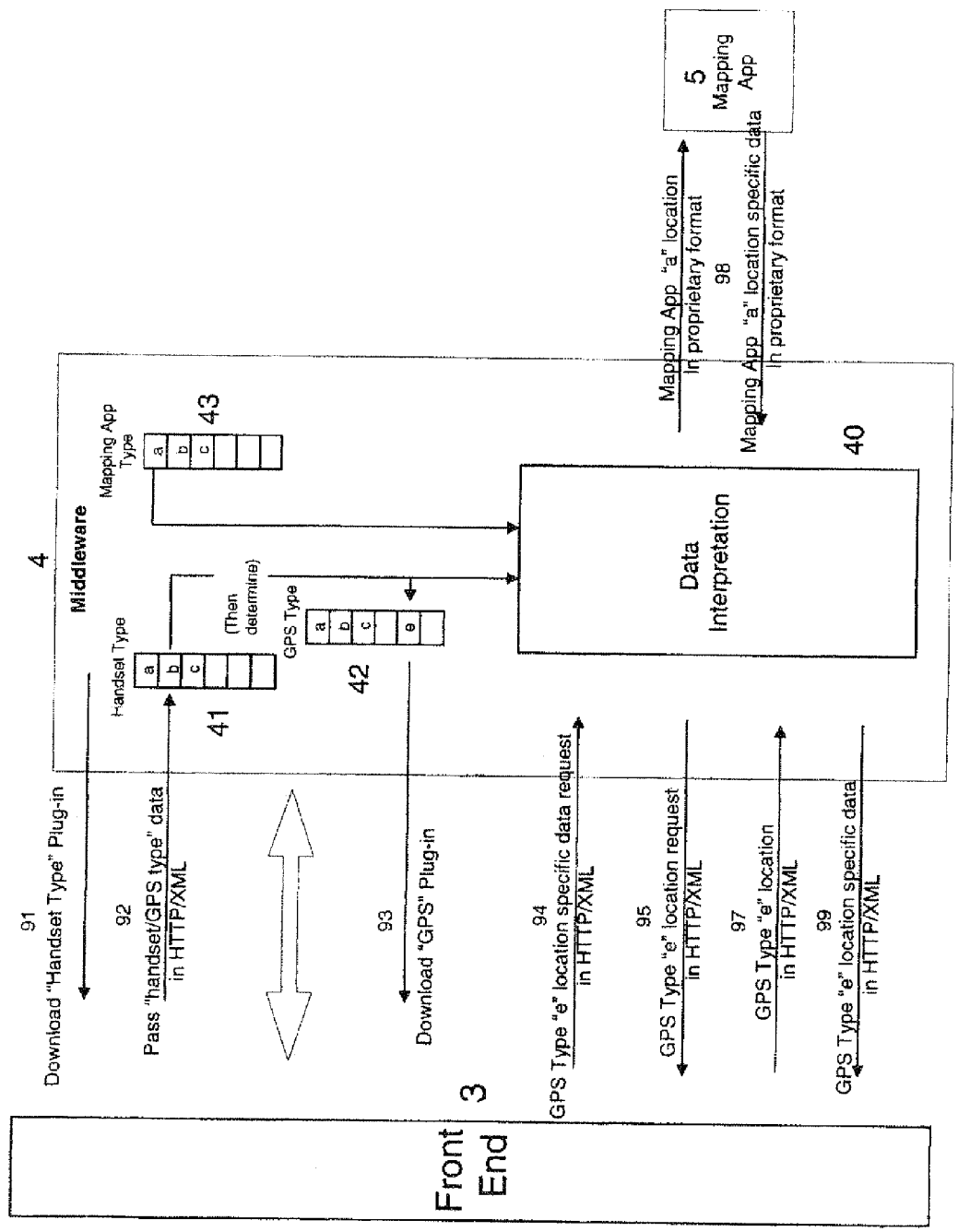
FIG. 4 is a schematic diagram showing the organisation and operation of part of the database access system in more detail.

The steps in this process are depicted in FIGS. 2, 3 and 4.

As already described, in response to a user command through the input 121, the browser 11 makes initial contact with the web server 2, instructing it to connect to the required service (step 90). The server 2 then connects the user to the requested address 3, which is the "front end" of the requested service. An associated billing and order management system 31 operates to control access to the system, for example to handle access control and billing matters if the service is available on subscription, or if the use of certain classes of data is restricted to authorised users.

The front end 3 recognises the request as one that is to be handled by the middleware 4 and forwards it there. The middleware 4 first needs to identify the format in which location data is to be presented to it, and returns a message 91 to the browser 11 instructing it to install a device type plug-in 111. This first plug-in download message 91 is in a standard format that is recognised by the browser 11.

The plug-in 111 is a program that creates an interface between the device browser 11 and the device operating system 13, or other software running on the system. The device-type plug-in 111 collects information 92 from the device operating system identifying the handset type, operating system version, GPS type etc, and/or its capabilities, and causes it to be transmitted to the middleware 4 in a message 92 by way of the ISP server 2 and front end 3.

Using the data 92 received from the first plug in 111, the middleware 4 can now identify the handset type from a look up table 41. From this it can determine the appropriate plug-in 112 specific to the type of location determination device 10 in the handset 1. In this example, the lookup table identifies handset type "b" as requiring GPS plug-in "e". This second plug-in 112, like the first, is downloaded in a message 93. This second plug-in 112 is arranged to cause the handset 1 to respond to location requests 95 received from the server 3 by interrogating the GPS application 10 and responding in a form 97 suitable for use by the middleware 4. The handset type is also communicated to the data interpretation system 40 to allow such location data 97 to be interpreted.

With the plug-in now installed, a location request 94 can be generated by the user, through the input 121, in a format appropriate to the plug-ins 111, 112 in the handset 1, in particular the type of position finding system 10. The request is received by the middleware 4 which responds to such a request by transmitting a request 95 for the current location of the device 1, in the format required by a position finding device 10 of the type specified in the request (type "e" in this example). The GPS plug-in 112 responds by interrogating the GPS system 10 (step 96) and forwarding the response (step 97), also in the format "e" used by the GPS system 10. The plug-in 112 may cause such data to be generated by the handset automatically, for example periodically, in response to an initial prompt 95 from the middleware 4, or the middleware may be required to generate a prompt 95 every time it requires a location update 97.

The format ("e") of the response generated by the position-finding system 10 in response to interrogation 96 depends on the programming of the individual handset. The position finding system 10 is primarily intended to generate an output on the user interface 122, and may be in any form suitable for this purpose. It may give location in terms of spherical co-ordinates (latitude and longitude), or a Cartesian grid reference (such as the National Grid used in the United Kingdom's Ordnance Survey), or administrative location (e.g. postcode (ZIP code)) or simply the identity of the cellular base station (or other beacon) giving the strongest radio signal, or in any other data format. Handsets may be capable of measuring location in more than one different way, for example using the location of the nearest cellular base station as a fallback when the handset is indoors and satellite navigation is not available.

Even if location is given according to a recognised standard such as latitude and longitude, the presentation of the data may vary from one device to another. For example some systems avoid the use of negative numbers in the treatment of longitudes by adding 180 degrees to all longitude values before performing arithmetical operations on the position data. Similarly, in the treatment of fractions of a degree, some systems use minutes of arc, whilst others use decimal fractions.

In contrast to the prior art systems, the invention does not require the position location system to use any specific format for the location data. Location data 97 can be generated in any form recognisable by the middleware 4. In the present invention the handset browser 11 forwards the location data to the web server 3 embedded in XML/HTTP in the form it has been retrieved using the plug-in 112.

The middleware 4 now has the location data 97. From the handset data 92, it can also determine the format in which the location data 97 has been supplied, and thus determine how to adapt it to the mapping application 5 and also to determine factors such as the level of precision that the location data has.

The data interpretation processor 40 of the middleware 4 now interprets the data 92, 94, 97 to generate a request for data relation to the location of the handset in a form 98 suitable for the mapping application 5, and forwards this request 98 to the mapping application 5. The middleware 4 may have access to more than one mapping application 5, in which case the appropriate data conversion program will be determined using look up tables 42, 43 both for the GPS type and the mapping application type.

The mapping application 5 can now perform an information retrieval process to identify local information data relevant to the request 98, which is specific to the nature of the request 94 and the location 97, for example to generate a map, or provide details of, and/or directions to, a specified facility such as the nearest restaurant, hospital, railway station etc. The mapping application 5 selects an area of coverage for this map appropriate for the nature of the request and the precision of the location data. A small scale is necessary, at least initially, if the user's location has been given with low precision, or if the service to be depicted is sparsely distributed. The user may be given the option of changing the scale manually.

On receiving the results of the interrogation 98, the middleware then converts the results from the format "a" delivered by the mapping application 5 to the format "e" required by the user device. The results 99 of the retrieval process are then returned to the application front end 3 which transmits them in http format to the user terminal 1 by way of the internet service provider (ISP) 2. The terminal's browser 11 can then generate an output for display 122, 123.

The middleware 4 may tailor the data 99 to the capabilities of the handset 1, for example whether output is to be audio, text, graphical, or some combination and, if visual content is to be provided, whether it is monochrome or colour, what screen dimensions are required, and so on. Such information is derived from the handset type "b" derived from the configuration data 92 supplied to the middleware 4.

The middleware 4 may monitor the location of the handset 1 dynamically, providing updates to the data provided as the handset moves. This allows directions to be given as the user requires them. Comparison of the present location with a recent location may also allow a more accurate estimate of the current location than is possible from an instantaneous measure alone. Changes of location may also be used to tailor the information provided to relate to a region towards which the user is travelling. For example, a user who has travelled 20 km north in the preceding ten minutes is likely to be more interested in the area ahead of him than in the area through which he has just passed. The speed of travel can also be used to determine the appropriate scale of the map to be presented, as a fast-moving user is likely to be interested in a wider area than a user moving at walking pace.

Because most of the processing is done by the middleware, industry-standard handsets can be used, and do not need downloading with special software programs to operate the process. Any updates to the location data, or to the services available, can be performed centrally in the middleware 4 and the mapping application data 5. Subject to any necessary authorisation by the billing system 31, a user can use the service without any preliminary need to subscribe to it or download any special software applications.

The invention claimed is:

1. Apparatus for processing requests for location-dependant information received from a communications terminal, comprising:
    a store of installable programming information for transmission to a communications terminal in response to a request for location-dependent information, the installable programming information being arranged to configure the communications terminal to interact with the apparatus to retrieve information in response to interrogation by the apparatus to identify its capability to report a location,
    means for generating a request for a location report from the communications terminal in a form appropriate to the identified capability,
    means for receiving a location report generated by the communications terminal,
    means for processing the location report such that location-dependent information related to the reported location can be selected,
    means for retrieving the selected location-dependent information data,
    means for transmitting the retrieved information to the communications terminal, and
    means to monitor the location data provided by the communications terminal over a period of time, wherein the means for retrieving data provides updated or modified location-dependent information according to changes in the location reported by the communications terminal;
    wherein the data selection means retrieves data relating to a region determined according to the speed and/or direction of change of the location reports.

2. Apparatus according to claim 1, having means to identify the process by which the terminal has derived the location data and select the location-dependent information accordingly.

3. Apparatus according to claim 2, having means to select location-dependent information according to an estimate of the precision of the location report.

4. Apparatus according to claim 1 further comprising means for selecting location-dependent information according to the type of data specified in the request.

5. A method of controlling an apparatus to process requests for location-dependant information, comprising:
    receiving a request generated by a communications terminal, location-dependant for such information,
    transmitting installable programming information to the communications terminal in response to the request, the installable programming information being arranged to configure the communications terminal to interact with the apparatus to retrieve information in response to interrogation by the apparatus to identify its capabilities, interrogating the communications terminal to identify its capability to generate location reports, in response to the reported capability, requesting a location report from the communications terminal in a form appropriate to the reported capability, receiving and processing the location report such that location-dependent information can be selected, retrieving the selected location-dependent information, and transmitting the retrieved location-dependent information to the communications terminal wherein location data provided by the requesting communications terminal is monitored over a period of time, and updated or modified location-dependent information is generated and reported to the requesting communications terminal according to changes in the location reported by the communications terminal; and wherein the data retrieved relates to a region determined according to the speed and/or direction of change of the location reports.

6. A method according to claim 5, wherein the communications terminal from which the request is received is interrogated to identify the process by which the terminal has derived the location data, and the location-dependent information is selected accordingly.

7. A method according to claim 6, wherein location-dependent information is selected according to an estimate of the precision of the location report.

8. A method according to claim 5 wherein the location-dependent information is selected according to the type of data specified in the request.

9. A method according to claim 5, wherein the requesting communications terminal is interrogated to determine its output capabilities of the communications terminal, and the data to be transmitted to the communications terminal is adapted to a format suitable for the said output capabilities.

\* \* \* \* \*